Jan. 12, 1932.                 C. C. GRAY                   1,840,505
                         GRAIN CLEANING MACHINE
                  Filed Nov. 17, 1927       3 Sheets-Sheet 1
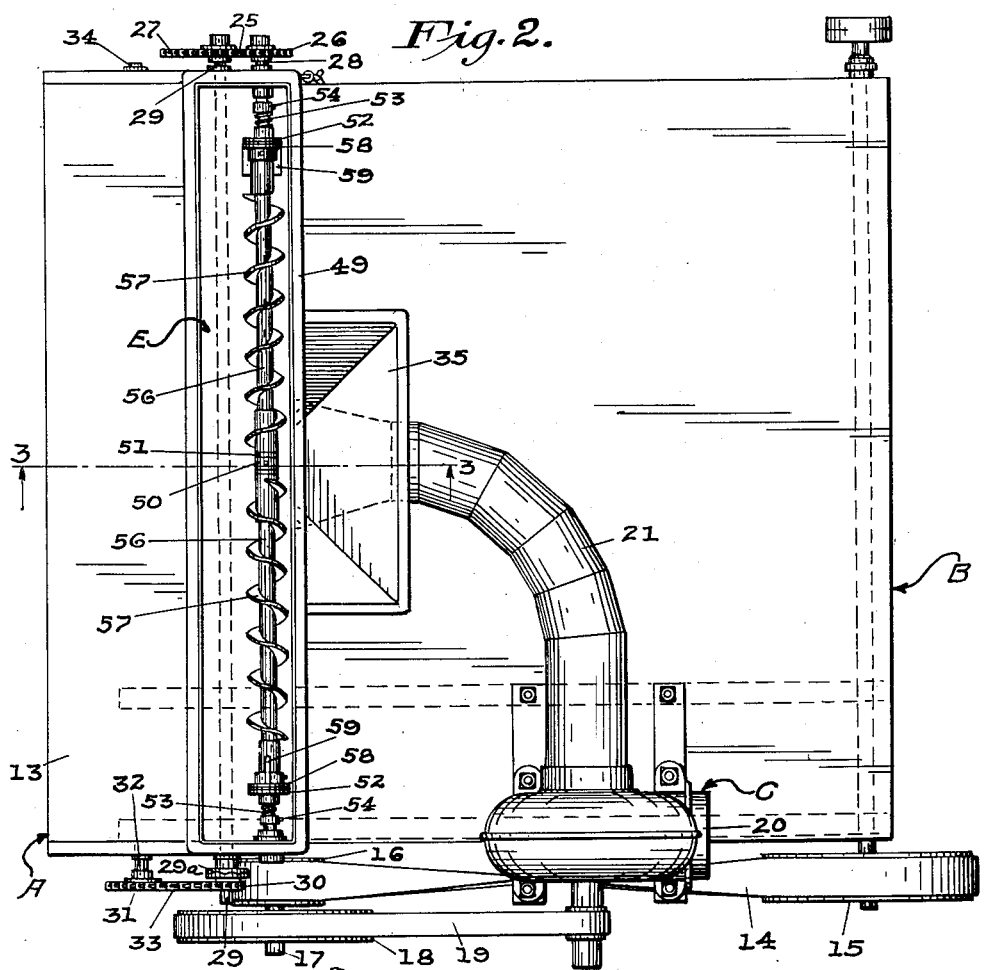
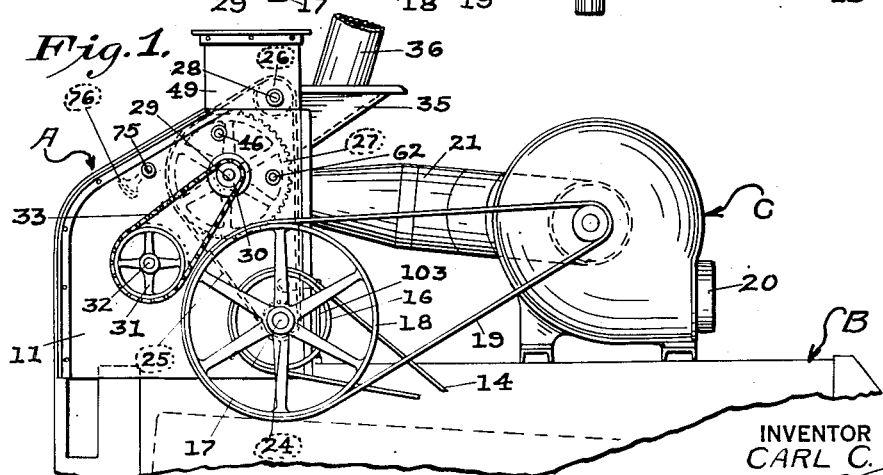
INVENTOR
CARL C. GRAY
BY
ATTORNEY

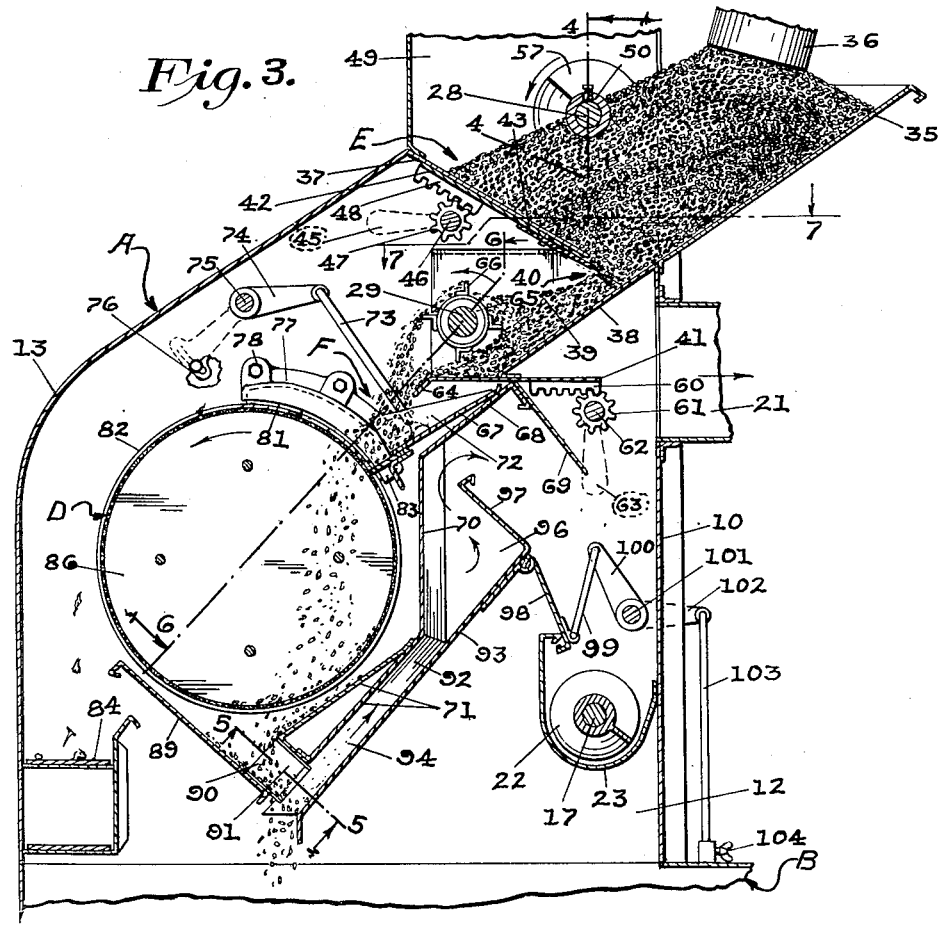
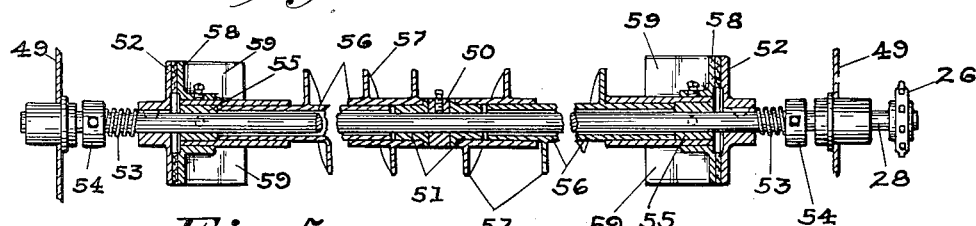
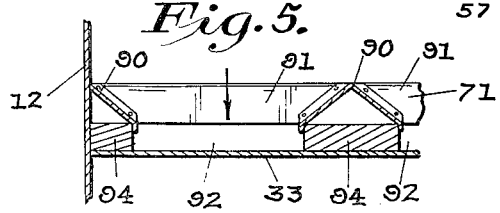

Jan. 12, 1932.  C. C. GRAY  1,840,505
GRAIN CLEANING MACHINE
Filed Nov. 17, 1927   3 Sheets-Sheet 3
Fig. 7.
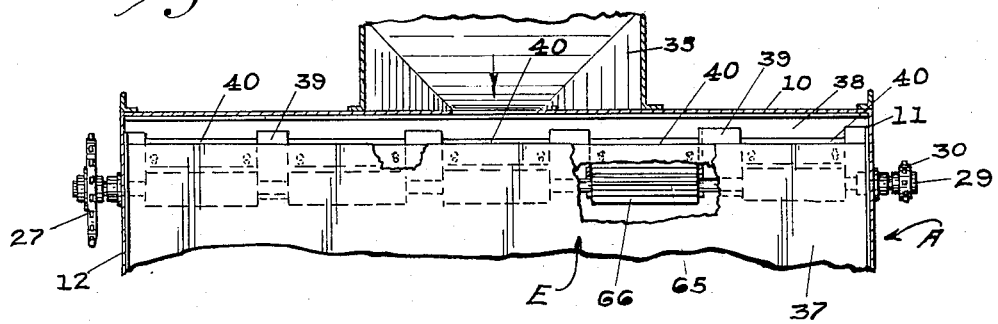
Fig. 6.
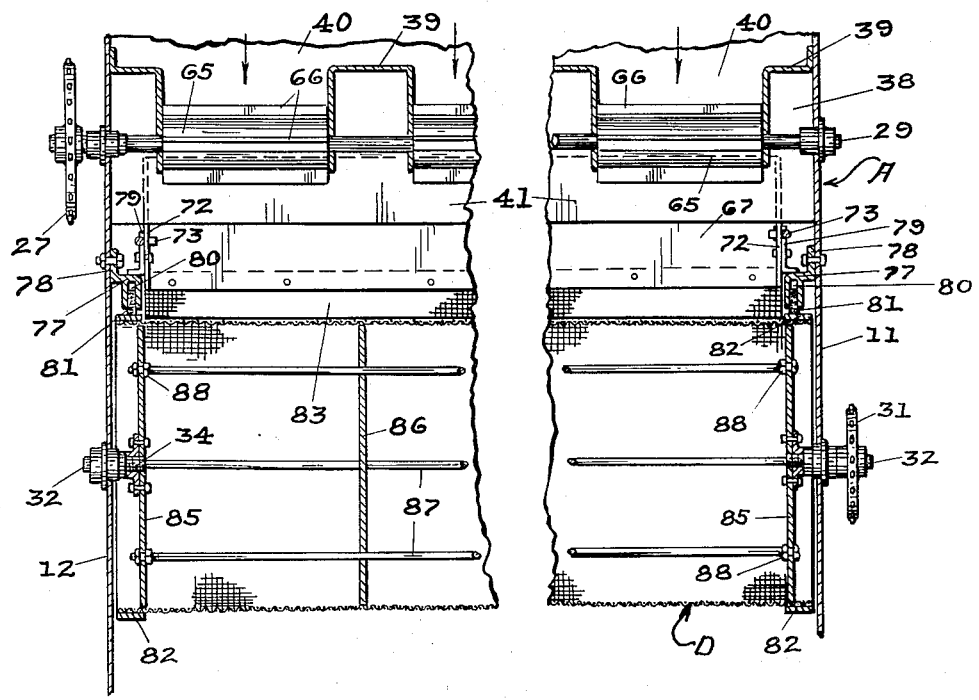
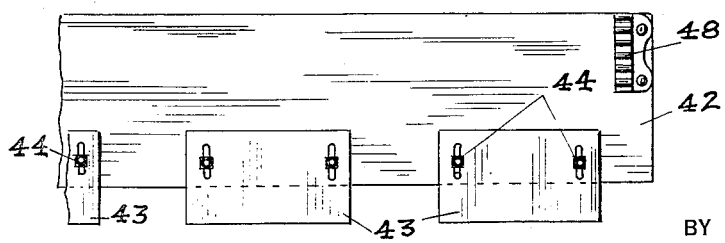
Fig. 8.
INVENTOR
CARL C. GRAY
BY
ATTORNEY Patented Jan. 12, 1932

1,840,505

UNITED STATES PATENT OFFICE

CARL C. GRAY, OF MINNEAPOLIS, MINNESOTA

GRAIN CLEANING MACHINE

Application filed November 17, 1927. Serial No. 233,956.

This invention relates to grain cleaning machinery, and the primary object is to provide a practical, efficient and comparatively simple machine for separating out both large and small foreign matter, such as sticks, nails, straw, dust and chaff, from the grain, before such grain is delivered to a grain separator, where it is divided out according to its various classes. Further and more specific objects are to provide, in a grain cleaning machine, a novel form of grain cleaning cylinder, improved means for feeding the grain from a hopper to the cylinder, improved means for spreading the grain in the hopper, so as to equalize the feed, and improved means for removing dust and other foreign matter from the grain which may have passed with the grain through the cylinder. Still other objects will be disclosed and described in the following specification wherein reference will be made to the illustrations in the accompanying drawings, which form a part of the specification, and in which like parts will be referred to by like characters throughout the various views.

In the drawings:

Fig. 1 is a side elevation of the machine, as from the left, and illustrating its position on a grain separator.

Fig. 2 is a top or plan view of the machine, as shown in Fig. 1.

Fig. 3 is an enlarged sectional elevation, as on the line 3—3 in Fig 2.

Fig. 4 is a longitudinal sectional detail view of the spreader device, as seen on the line 4—4 in Fig. 3.

Fig. 5 is a detail section, on the line 5—5 in Fig. 3.

Fig. 6 is a sectional elevation on the line 6—6 in Fig. 3, a central portion being broken out.

Fig. 7 is a sectional, detail plan view about as on the line 7—7 in Fig. 3, but on a reduced scale.

Fig. 8 is a detail plan view of one of the feed gates, as seen when viewed from its under side.

Referring to the drawings more particularly and by reference characters, A designates a housing, having a rear wall 10, end walls 11 and 12, and a partly vertical and partly inclined front wall 13. The cleaning machine may be used independently, as such, but in the present instance, I have shown it as mounted upon a separator B, with which it is simultaneously driven. This separator may be of any type, but I have indicated it as of the type shown in my Patent No. 1,660,645, issued February 28, 1928, wherein a plurality of separating cylinders are arranged to receive the grain from a superimposed cleaning machine.

Power is applied to the cleaning machine, by a belt 14 that passes over a pulley 15 on the separator and over a pulley 16 on the cleaning or scalping machine. The pulley 16 is mounted on a shaft 17, journaled in the end walls 11 and 12, and this shaft has a second pulley 18 that drives a fan C, by means of a belt 19. The fan is preferably of the centrifugal type, having an outlet 20, and an inlet pipe 21 that connects with the rear housing wall 10 so that a forced draft will be created through restricted parts of the housing A, by the partial vacuum effected in the pipe 21 by the fan.

The shaft 17 also carries a screw conveyor 22 (Fig. 3), that operates in a trough or settling chamber 23, to deliver material dropped into it out through one end of the housing. At its right end, the shaft 17 carries a sprocket pinion 24 that drives a sprocket chain 25, which in turn passes over a sprocket pinion 26 and a sprocket gear 27, respectively carried on shafts 28 and 29. At its left end, the shaft 29 carries a sprocket pinion 30 that drives a gear 31 on a shaft 32 through a chain 33. The shaft 32 is a stub shaft that journals in the end wall 11 and is the supporting and driving shaft for one end of a scalping cylinder D. A similar stub shaft 34 journals in the end wall 12 to support the other end of the cylinder The shaft 29 may have a slip-clutch 29a to prevent breaking any parts should the machine become clogged.

At the top of the machine is provided a hopper E having a receiving spout 35, adapted to receive grain as by a pipe 36, usually extending from a grain bin above. The hopper bottom is composed primarily of an inclined plate 37, the lower edge of which is spaced from the upper end of an oppositely inclined plate 38. Both plates, however, extend the entire length of the housing a, and partly for the purpose of supporting the plate 37, between its ends, I provide a series of spaced boxings or hollow dividing members 39. These members are substantially U-shaped in cross section, and, as inverted rest upon the plate 38 where they are suitably secured. The members 39 thus effectively separate the outlet of the hopper E into (in the present case) five separate discharge ports 40, (Fig. 7), and as the grain drops through these openings it travels down the plate 38 to the gate 41, later to be described.

In order to simultaneously regulate the flows of grain through the ports 40 I provide a gate 42 (Figs. 3 and 8) that is arranged immediately under the plate 37, and above the members 39. This gate has a series of plates or slides 43, that guide between the member 39, and, as the main gate 42 is moved up and down the smaller gates or extensions 43 will open and close the ports 40. The extension plates 43 are adjustably secured to the gate 42, as at 44, so that the port openings may also be adjusted with respect to each other, when necessary. The gate is reciprocated, or opened and closed by a handle 45, operating through a shaft 46 having a pair of pinions 47 that mesh with two racks 48, one at each end of the gate.

It is the object to clean the grain as fast as it is discharged through the ports 40, and therefore the grain may accumulate in the hopper E as shown in Fig. 3, and this accumulation may stop only when the feed pipe 36 becomes choked. But, unless otherwise provided for, the natural level or flow of the grain, which comes centrally into the hopper, from the tube 36 and through the chute 35, will not carry it to the right and left extremities of the hopper, so that it will not sufficiently supply the end ports 40, when it is desired to run the machine at full capacity. I therefore provide a spreader mechanism that is shown in Figs. 1–4, and may be described as follows:

A rectangular housing 49 is arranged over the hopper E and seats on the housing A. It rotatably carries the shaft 28 that is driven by the chain 25, as previously noted. Within the housing 49, the shaft 28 rigidly carries, at its center, a collar 50 having bearing extensions 51, and, toward the ends of the shaft are slidably keyed a pair of friction disks 52. These disks are normally pressed inwardly by springs 53, abutting collars 54. Within the disks 52 a pair of bearings 55 are secured upon the shaft. Mounted upon the respective sets of bearings 51 and 55 is a pair of sleeves 56 having integrally formed screw conveyors 57, but which spiral in opposite directions so that when rotated in the same direction, they will tend to urge the grain toward opposite ends of the hopper. The outer ends of the screw devices 56—57 are provided with friction disks 58, which co-act with the disks 52, and from which inwardly extend pairs of radial paddles or wings 59.

The function and action of the spreader or distributing mechanism may be described, as follows.

When the grain accumulates, in the center of the hopper, as shown in Fig. 3, it rises into engagement with the feed screws 57, which are continually rotating with the shaft 28, under the drive action of the friction clutches 52, 58. When the grain piles up throughout the entire length of the hopper, however, it gives an added or accumulated resistance to the feed screws, especially when it meets the paddles 59, which are directly resisted by the grain, and under this combined resistances the feed screws will not rotate, and will slip with respect to the disks 52, which yield under the action of the springs 53, until enough grain has been discharged through the end ports 40, so that the grain resistance will be reduced, after which the screws will again take up their work. It will thus be seen that the screws 57 will very efficiently distribute the grain, yet cannot carry an excessive supply of grain to the hopper ends, which they would do if positively driven at all times.

It may here be noted that if it is convenient to feed the grain into the hopper E at spaced intervals, as by several feed pipes 36, then the distributor is unnecessary and may be taken off merely by removing the housing 49 and readjusting the drive chain 25.

As the grain escapes from the hopper E, through the ports 40, it runs down the plate 38 to the horizontally disposed gate 41, that is slidably mounted so that it may be adjusted forwardly and rearwardly. For this purpose the gate is provided with toothed racks 60 that engage pinions 61, carried on a shaft 62 that may be oscillated by a handle 63, or other suitable means, in substantially the same manner as the gate 42 is adjusted. The forward edge of the gate 41 has an inclined flange 64 (Fig. 3).

The shaft 29 is disposed above the forward end portion of the gate 41, extends through the members 39, and between these members is provided with a series of feed rolls 65, having radial flanges 66. Thus, there will be one feed roll for, and of the same length as, each port 40. The shaft 29 rotates in a counter clockwise direction, as seen in Fig. 3, and in so doing causes the feed roll flanges to carry over charges of the downcoming grain, and drops this grain over the forward edge of the gate 41, to the scalping cylinder D.

It will be noted that the feed rolls are spaced above the gate 41, so as to allow a substantial clearance therebetween. This fact is of great importance, as it eliminates a very serious objection, that otherwise occurs when this clearance is not provided for. Thus, if the feed roll operates immediately above the gate, it is found that it will carry over grain, but it will only engage the upper stream portion and it is soon noticed that dust and dirt will settle to the bottom and will form a bank of accumulating material that will not move down the slide, but will pile up and be very objectionable. By raising the feed rolls, as shown, this objection is entirely eliminated, and it is found that the entire stream from the ports 40 will move down in a body, the major portion being carried over by the feed rolls and the balance moving under the rolls. As the peripherally spaced feed roll flanges 66 take up charges of grain, such grain is replaced by successive movements of the flow from above, and as these movements are periodic or at intervals they supplement other moving parts of the machine to produce a vibratory action to the plate 38 and gate 41. This vibration, while not extensive, is sufficient to cause the grain at the bottom of the flow to slip on the members 38 and 41, and escape over the forward edge of the latter. This it will not do if the feed rolls are close to the gate and no clearance is provided under them.

The feed rolls 65, to function properly, must rotate in a counter-clockwise direction, as seen in Fig. 3, so that they will carry over all sticks, cobs, and other large objects, there being plenty of clearance between the rolls and the gate 42 for such objects. If the rolls operated in the opposite direction, it will be seen that large objects would become wedged in between the rolls and the gate 41, thus injuring or stopping the machine. It will also be noted that the gate 41 projects forward of the rolls 65, the object being to give sufficient support to the grain so that it will accumulate and choke under the rolls, when the latter are stopped, and prevent the under flow of grain, when the machine is idle. It will thus be seen that when the machine is stopped the grain flow from the hopper E to the cleaning cylinder will cease, and without it being necessary to close any grain doors or gates, as is usually the case. It will also be noted that when it is desired to quickly empty the machine, for cleaning, repair, etc., it is only necessary to pull the gate 41 completely back, thus permitting all the grain in the hopper to drop down very quickly.

As the grain is discharged from the feed rolls 65, and over the front flange 64 of the gate 41, it drops down into a trough F, formed by the upwardly and forwardly moving surface of the cylinder D, and by an inclined shelf 67, the rear end of which slidably rests on a plate 68. The plate 68 has a baffle 69 extending from its rear edge, while it continues, at its forward edge, in a wall 70 having an inclined lower portion 71. The plate members 68, 69, 70 and 71 extend entirely across the machine and connect with the end walls 12 and 11. The shelf 67, being adjustable, operates between the end walls of the housing, and in order that grain may not escape over the ends of the shelf, it is provided with end flanges 72. The shelf is raised and lowered by link bars 73 that connect, at their lower ends, with the flanges 72, while their upper ends are carried in arms 74 of a shaft 75 that extends the length of the machine and is adjustably secured, in various positions, by a segment 76.

Small angular brackets 79, on the ends of the shelf 67, rest upon substantially arcuate shoulders 77 of brackets 78 secured upon the inner faces of the side walls 11 and 12, close to the cylinder D, and the brackets ride on these shoulders when the shelf is adjusted by regulating the segment 76. The brackets 78 are provided with elongated recesses 80 in which guide a pair of arcuate sealing segments 81. The segments, which are preferably of fiber, are free to move, radially, in the brackets, and rest upon rings 82, at the ends of the cylinder D, so as to seal the ends of the trough F and prevent grain from escaping over the ends of the cylinder.

The lower edge of the shelf 67, proper, is spaced from the periphery of the cylinder D, and to prevent the downward escape of grain at this point, I provide the shelf with a flexible closing strip 83, that reaches to the cylinder.

The separating cylinder D is of the perforated or woven wire type, through which the grain and other small materials may pass, but which will not permit nails, sticks, cobs, and other large objects to go through, and carries these objects over, dropping them upon a suitable conveyor such as a belt 84. In order that the cylinder D may properly function it is necessary that a considerable amount of material be permitted to accumulate in the trough F. Otherwise long thin objects dropping down from above may pass directly through the screen. But with the material banked up in the trough the rotation of the cylinder against the under side of the material will have a tendency to pull or drag the long and larger objects away, in a tangential position over the top of the cylinder, yet will not prevent the grain and smaller particles from passing through. To regulate the capacity of the screen, and consequently the volume of grain in the trough, in proportion to the volume of material coming from above, it is only necessary to regulate the position of the shelf 67, by the segment 76. Thus, when the flow of grain is light the shelf 67 is raised, and, by lowering the shelf a greater and more inclined screen surface is exposed to the trough with a result that an increased flow from above can be accommodated.

The scalping cylinder D has a pair of end plates 85, to which are secured the arbors 32, and suitably spaced within the cylinder are circular bracing plates 86. Longitudinally extending bracing rods 87 extend through the cylinder, are secured in the end plates 85, as at 88, and may also be secured, as by welding, to the inner plates 86. Thus the cylinder is rigidly braced.

As the grain and smaller particles fall through the cylinder D, they drop into a trough formed by the member 71 and an inclined plate 89, that is divided by a series of inclined, bracing dividers 90, that separate this long opening into ports 91. These ports discharge the material into the lower ends of inclined flues 92 that are formed by the plate 71, a second plate 93, and by divider strips 94, that extend up between these plates and brace them with respect to each other. The lower ends of the flues 92 are open so that the grain may pass down to the separating machine B. At their upper ends the flues 92 open into a chamber 96, formed by the wall 70, the upper end of the plate 93, and by a baffle flange 97 which extends up between the wall 70 and the baffle 69.

Between the upper end of the plate 93 and the settling chamber 23, is a damper or draft control door 98, that is regulated by links 99 connected to arms 100 of a shaft 101. The shaft is adjusted by an arm 102 having a rod 103 adjustably secured as at 104.

When the damper 98 is closed, and the machine is operating, the entire draft to the pipe 21 is confined to the flues 92, and the purpose of this air current is to separate from the grain all dust, chaff and other relatively light material, before the grain drops out at the lower end of the machine. If the draft or air current is excessively strong in the flues 92 it may be relieved by opening the door 98. As the air current passes through the grain in its upward course, it may carry some of the lighter grain with it, and when this occurs such grain will strike the baffle plate 97. At this point the chamber 96, being larger in cross section than the flues, retards the current and permits the grain to fall back on the plate 93. Such grain, no longer being suspended in the air current, will roll back down the plate 93 and will again mingle with the main grain flow.

All the material that is not intercepted by the baffle 97 will pass over it with the air current, and to further separate this material, I provide the baffle 69, under which the air current must pass before reaching the blower pipe 21. The heavier portion of the material passing over the baffle 97 will strike the baffle 69 and be deflected downward, the dust and other light substance passing under and up to the pipe 21. The deflected material, aided by gravity, loses its momentum, and drops into the settling chamber 23, from which it is carried away by the screw 22.

It may here be noted (see Fig. 3) that the housing A is seated over an opening in the separating machine B, and that all the air flowing through the housing, to the pipe 21, must come up through this opening, either entirely through the flues 92 or through them and partly under the damper 98. In either event the entire air current is through and from the separating machine, with a result that it gathers up much of the dust from this machine and carries it away through the blower pipe 21.

It is apparent that various changes and modifications may be made in the size, proportions, arrangement, and design of the various parts of the machine, as above described, and of which the drawings are merely illustrative, without departing from the spirit and scope of the appended claims. Having now, therefore, disclosed my invention in detail, what I claim is:

1. The combination with a hopper adapted to receive material, of means, for distributing the material, which comprises a longitudinally yieldable spreader device and means for frictionally operating endwise against the same whereby when a predetermined volume of material has been distributed it will move the spreader endwise to reduce the driving friction thereagainst.

2. The combination with a grain treating machine, having an elongated hopper at its upper end, said hopper having surrounding walls to confine a body of grain, of a spreader in the hopper for spreading the grain throughout the length of the hopper, and means for yieldingly operating the spreader whereby when the spread grain reaches a predetermined level it will act upon, resist, and stop the spreader, until enough grain has been discharged to the treating machine to reduce the resistance, whereupon the spreader will again operate.

3. The combination with an elongated hopper adapted to receive grain at a given point, having a longitudinally extending series of spaced ports in its bottom through which the grain is discharged from the hopper, of yieldingly driven means for distributing the grain from said receiving point to feeding position above the ports.

4. The combination with a hopper adapted to receive grain at a given point, having spaced ports in its bottom through which the grain is discharged from the hopper, of means, retardable under the resisting action of an excessive volume of grain in the hopper, for spreading the grain body in the hopper, away from the point where it is received into the hopper and to a position above the bottom ports.

5. A grain distributing device, comprising a continuously rotating shaft having a disk rotatable therewith, a spreader screw rotatably mounted on the shaft and having a disk at one end for frictional engagement with the first mentioned disk, said screw being provided, at one end, with a radially disposed member for stopping engagement with the grain.

6. In a grain cleaning machine, having a cleaning mechanism and a hopper, a support for conducting grain from the hopper to a feeding position with respect to the cleaning mechanism, and a feed roll operative over the support but spaced therefrom, said support consisting, in part, of a horizontally adjustable plate.

7. A grain feeding device comprising an inclined grain support, a horizontally disposed gate extending from the bottom of the support and mounted for horizontal adjustment toward and away from the support, and a feed roll positioned above the gate and spaced therefrom, said roll being provided with grain feed devices for carrying the grain over the roll and discharging it over the forward edge of the gate.

8. A grain feeding device comprising a grain stream support, a plate at the lower end of the support, a feed roll positioned over the plate and adapted to normally carry over the major portion of the grain stream, said roll being spaced from the plate so as to permit the balance of the grain stream to pass between the roll and the plate, and means for adjusting the plate.

9. A grain feeding device comprising a grain stream support, a plate at the lower end of the support, a feed roll positioned over the plate and adapted to normally carry over the major portion of the grain stream, said roll being spaced from the plate so as to permit the balance of the grain stream to pass between the roll and the plate, said plate being retractable whereby the entire grain flow may be discharged, under the feed roll.

In testimony whereof I affix my signature.

CARL C. GRAY.